UNITED STATES PATENT OFFICE.

WILHELM HERZBERG AND MAX RONUS, OF BERLIN, GERMANY, ASSIGNORS TO ACTIEN GESELLSCHAFT FÜR ANILIN FABRIKATION, OF BERLIN, GERMANY.

RED AZO DYE AND PROCESS OF MAKING SAME.

954,960.

Specification of Letters Patent. Patented Apr. 12, 1910.

No Drawing. Application filed January 3, 1910. Serial No. 536,154.

*To all whom it may concern:*

Be it known that we, WILHELM HERZBERG and MAX RONUS, citizens of (the former) the German Empire and (the latter) the Swiss Republic, residing at Berlin, Germany, our post-office addresses being (the former) Landshuterstrasse 24, Berlin, W. 30, and (the latter) Schöneberger Ufer 36ᵃ, Berlin, W. 35, have invented certain new and useful Improvements in Red Azo Dyestuff and Process of Making Same, of which the following is a specification.

We have found that by diazotizing 1-amino-2-methyl-4-nitrobenzene:

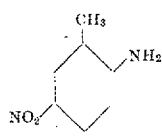

and combining the diazo compound thus obtained with beta-naphthol a red azo dyestuff is obtained, which shows a very clear and brilliant red tint and is insoluble in alcohol and "oil," as for example linseed-oil varnish. The new product is also distinguished by a great fastness to light and is more especially adapted for the manufacture of color-lakes. In manufacturing such color-lakes the dyestuff may be mixed with a suitable lake-substratum usually; but the lakes may also be produced in combining the formation of the dyestuff with the manufacture of the lakes.

The following example may serve to illustrate our invention, the parts being by weight: 15.2 parts of 1-amino-2-methyl-4-nitrobenzene are dissolved while heating in a mixture of 60 parts of hydrochloric acid of 12° Bé. and 30 parts of water. This solution is poured on ice and the diazotization performed by adding in one portion while stirring an aqueous solution of 7 parts of sodium nitrite. The reaction being finished after some time the diazo solution is filtered and the filtrate introduced into a fine suspension of 15 parts of beta-naphthol; in order to finish the combination sodium carbonate is added till neutralization occurs. The product of the reaction separates and is isolated by draining and washing with water; the dyestuff may be employed in the form of the paste thus obtained or it may be dried and powdered. The new product thus obtained forms in the dry and pulverized shape a clear and brilliant red powder which is insoluble in water and in oil (boiled linseed-oil); it is also insoluble in alcohol at ordinary temperature, whereas on boiling the alcohol assumes a yellow color, a very small proportion of the dyestuff being dissolved. The powder when acted upon with concentrated soda-lye at ordinary temperature turns to red-brown, but by adding a mineral acid the original red tint is reproduced, whereas on boiling with concentrated soda-lye the color turns to a dull brown and the solution assumes a yellow color. Dilute soda-lye does not change the color. In concentrated sulfuric acid the dyestuff dissolves to a red-violet solution which on the addition of ice separates red-orange flakes.

It is obvious to those skilled in the art that our present invention is not limited to the foregoing example or to the details given therein. For instance, the production of the dyestuff may be combined with the formation of a lake, so that the combination of the diazo compound with the beta-naphthol and the production of the lake occur simultaneously. For instance, the suspension of the finely divided beta-naphthol is mixed with a suitable lake substratum, such as aluminum hydrate, and into this mixture is introduced the diazo solution prepared from the 1-amino-2-methyl-4-nitrobenzene.

Having now described our invention and the manner in which it may be performed what we claim is,—

The hereinbefore-described monoazo dyestuff which may be obtained by diazotizing 1-amino-2-methyl-4-nitrobenzene and combining the diazo compound thus obtained with beta-naphthol, which new product is especially adapted for the manufacture of lakes and forms in the dry and pulverized shape a clear and brilliant red powder which is insoluble in water and in oil, this new dyestuff being insoluble in alcohol at ordinary temperature, whereas on boiling the alcohol assumes a yellow color, and which new dyestuff when acted upon with concentrated soda-lye at ordinary temperature turns to red-brown, the original red tint being reproduced by adding a mineral acid, whereas on boiling with concentrated soda-lye the color turns to a dull brown, the solution assuming a yellow color, the tint of this new product not being altered by the action of dilute soda-lye, and this new dyestuff dissolving in sulfuric acid to a red violet solution which on the addition of ice separates red-orange flakes, and which new product is split up by the action of strong reducing agents, thus yielding para-toluylenediamin besides ortho-aminonaphthol.

In testimony whereof we have hereunto set our hands in presence of two subscribing witnesses.

WILHELM HERZBERG.
MAX RONUS.

Witnesses:
HENRY HASPER,
WOLDEMAR HAUPT.